UNITED STATES PATENT OFFICE.

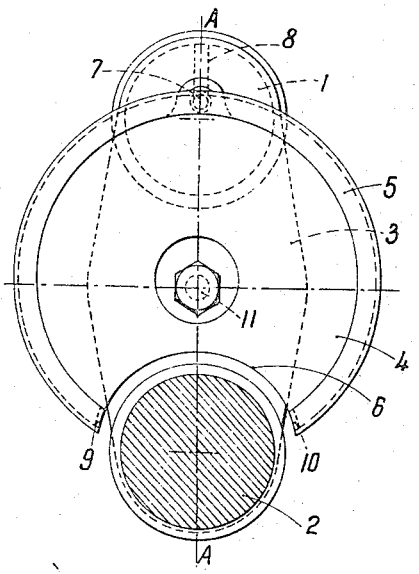
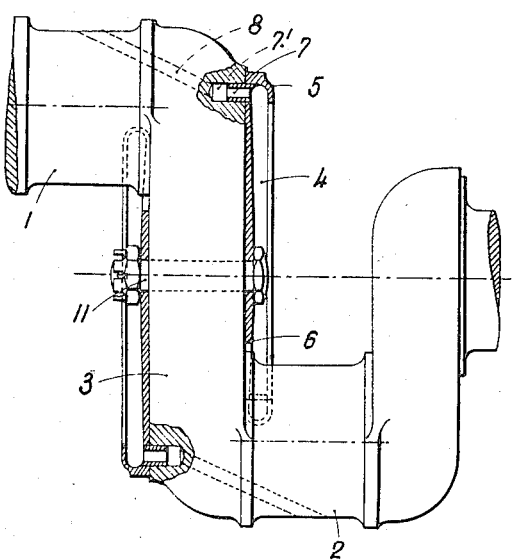

PIERRE LÉONARD LEISSE, OF BILLANCOURT, FRANCE, ASSIGNOR TO LOUIS RENAULT, OF BILLANCOURT, FRANCE.

LUBRICATION OF MOTORS.

1,141,351.  Specification of Letters Patent.  Patented June 1, 1915.

Application filed January 19, 1914. Serial No. 813,081.

*To all whom it may concern:*

Be it known that I, PIERRE LÉONARD LEISSE, citizen of the French Republic, residing at Billancourt, Department of the Seine, in France, have invented certain new and useful Improvements Relating to Lubrication of Motors; and I do hereby declare the following to be a full, clear, and exact description of the invention, such as will enable others skilled in the art to which it appertains to make and use the same.

This invention relates to lubricating systems for motors, and especially to systems intended to insure good lubrication of the crank pins and the connecting rod head bearings.

The object of the invention is to provide means especially adapted for use in connection with splash lubricating systems to insure the supply of a quantity of lubricant to the connecting rod head bearings. This is preferably accomplished by collecting a portion of the lubricant splashed in the crank case of the motor on disks secured to the side walls of the crank arms, the disks being provided at their peripheries with circular grooves which collect the lubricant thrown outwardly by centrifugal force. From the circular grooves, the lubricant is conducted to the surface of the crank pins to lubricate the connecting rod head bearings by suitably formed conduits. This arrangement of parts is simple in its construction and may be readily assembled and insures an excellent lubrication of the parts in a motor, in which the splash lubricating system is employed.

The invention is illustrated in the accompanying drawing, in which:—

Figure 1 is a sectional view of a crank shaft with the improved lubricating means applied thereto: and Fig. 2 is a broken sectional view taken on the line A—A of Fig. 1.

In Fig. 1, two adjacent crank pins are shown, to which the connecting rod heads may be connected in the usual manner. The crank pins 1 and 2 are connected by the crank arm 3 of the crank shaft. Circular disks 4, provided at their peripheries with grooves 5, are secured to opposite sides of the crank arm 3. A small tube 7, engaging in a recess 7' of the crank arm, places each groove 5 in communication with the outer surface of one of the crank pins through the intermediary of an inclined conduit 8. In the present instance, the disks 4 are of such size that the crank pins would interfere with the proper positioning of the disks, and for this reason, the disks are provided with recesses 6 conforming in shape to the contour of the crank pins, so that when the disks are positioned, each recess in the disk will accommodate the adjacent crank pin, as clearly shown in Fig. 1.

The operation of the construction is as follows: During the operation of the motor, the lubricant splashed inside of the crank case is collected on the disks 4, and it is then thrown by centrifugal force to the peripheral grooves 5, where it is collected and conducted, by means of the inclined conduits 8, to the surfaces of the crank pins. The lubrication of the connecting rod head bearings, is, therefore, insured. The disks, if so desired, may be mounted in eccentric relation with respect to the axis of the crank shaft, and the disk so positioned that the conduit 8 will communicate with the groove 5 at the extremity of the longest radius of the disk. Under these conditions, the greater part of the lubricant will collect in that portion of the groove adjacent the conduit 8.

Obviously, numerous changes may be made in the details of construction without departing from the spirit or scope of the invention, as defined in the accompanying claims.

What I claim is:—

1. In a motor having a crank shaft, a lubricant-collecting disk secured to the side of the crank arm and disposed in eccentric relation with the axis of the crank shaft, and a conduit adapted to conduct the lubricant collected on said disk to one of the adjacent crank pins, said conduit communicating with the disk at the extremity of the greatest radius of the disk.

2. In a motor having a crank shaft, a lubricant-collecting disk secured to one side of one of the crank arms in eccentric relation with the axis of the crank shaft and provided with a peripheral groove adapted to collect lubricant splashed on the disk, and a conduit adapted to conduct the lubricant so collected in said groove to the surface of one of the crank pins, said conduit communicating with the disk at the extremity of the greatest radius thereof.

In testimony whereof I affix my signature, in presence of two witnesses.

PIERRE LÉONARD LEISSE.

Witnesses:
   HANSON C. COXE,
   EMILE KLOTZ.